United States Patent
Kim et al.

(10) Patent No.: US 10,079,816 B2
(45) Date of Patent: Sep. 18, 2018

(54) METHOD AND DEVICE FOR MANAGING PROFILE

(71) Applicant: Samsung Electronics Co., Ltd., Gyeonggi-do (KR)

(72) Inventors: Dong Yeol Kim, Gyeonggi-do (KR); Hyun Jae Kim, Gyeonggi-do (KR); Jin Seub Eum, Gyeonggi-do (KR); Soon Hyun Cha, Gyeonggi-Do (KR); Jin Ho Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 337 days.

(21) Appl. No.: 14/957,285

(22) Filed: Dec. 2, 2015

(65) Prior Publication Data
US 2016/0156607 A1 Jun. 2, 2016

(30) Foreign Application Priority Data
Dec. 2, 2014 (KR) .................. 10-2014-0170223

(51) Int. Cl.
| | |
|---|---|
| *H04L 29/06* | (2006.01) |
| *H04W 4/50* | (2018.01) |
| *H04W 4/60* | (2018.01) |
| *H04W 12/06* | (2009.01) |
| *H04W 84/12* | (2009.01) |

(52) U.S. Cl.
CPC .............. *H04L 63/08* (2013.01); *H04W 4/50* (2018.02); *H04W 4/60* (2018.02); *H04W 12/06* (2013.01); *H04W 84/12* (2013.01)

(58) Field of Classification Search
CPC ...... H04L 63/08; H04W 4/001; H04W 4/003; H04W 12/06; H04W 84/12; H04W 4/50; H04W 4/60

USPC ............................................. 726/7
See application file for complete search history.

(56) References Cited

U.S. PATENT DOCUMENTS

| | | |
|---|---|---|
| 5,963,206 A | 10/1999 | Ulrich et al. |
| 6,199,158 B1 | 3/2001 | Hirsch |
| 6,239,795 B1 | 5/2001 | Ulrich et al. |
| 6,958,758 B2 | 10/2005 | Ulrich et al. |
| 9,100,918 B2 | 8/2015 | Ruvalcaba et al. |
| 2001/0001875 A1 | 5/2001 | Hirsch |
| 2003/0052921 A1 | 3/2003 | Ulrich et al. |
| 2010/0311402 A1* | 12/2010 | Srinivasan ............ H04W 8/183 455/418 |
| 2010/0311404 A1* | 12/2010 | Shi ....................... H04W 8/205 455/419 |

(Continued)

FOREIGN PATENT DOCUMENTS

| | | |
|---|---|---|
| KR | 10-2013-0026958 | 3/2013 |
| KR | 10-2014-0021069 | 2/2014 |

*Primary Examiner* — Kambiz Zand
*Assistant Examiner* — Benjamin Kaplan
(74) *Attorney, Agent, or Firm* — The Farrell Law Firm, P.C.

(57) ABSTRACT

An electronic device and a method for operating the electronic device are provided. The electronic device includes a secure memory including at least one profile, a processor configured to generate profile extended information for each of the at least one profile, based on profile information, update the profile extended information based on network information obtained by a network search, a memory configured to store the profile extended information, and a communication interface configured to perform the network search.

16 Claims, 9 Drawing Sheets

(56) References Cited

U.S. PATENT DOCUMENTS

| | | |
|---|---|---|
| 2012/0272231 A1 | 10/2012 | Kwon et al. |
| 2013/0039241 A1 | 2/2013 | Ruvalcaba et al. |
| 2013/0329639 A1* | 12/2013 | Wietfeldt .............. H04W 88/06 370/328 |
| 2014/0329502 A1 | 11/2014 | Lee et al. |
| 2015/0281957 A1* | 10/2015 | Hartel ................... H04M 1/675 455/411 |
| 2016/0227471 A1* | 8/2016 | De Foy ................. H04W 4/001 |

* cited by examiner

METHOD AND DEVICE FOR MANAGING PROFILE

PRIORITY

This application claims priority under 35 U.S.C. § 119(a) to a Korean Patent Application filed on Dec. 2, 2014, in the Korean Intellectual Property Office and assigned Serial No. 10-2014-0170223, the entire disclosure of which is incorporated herein by reference.

BACKGROUND

1. Field of the Disclosure

The present disclosure relates generally to a technique for managing a profile.

2. Description of the Related Art

Unlike conventional removable cards, such as a subscriber identifier module (SIM) card, a universal subscriber identifier module (USIM) card, and a universal integrated circuit card (UICC), an embedded UICC (eUICC) or an embedded SIM (eSIM) are cards which are mounted on an electronic device in the form of a chip during the manufacturing process of the electronic device, and thus the eUICC or eSIM may not be removed by a user. The eUICC or the eSIM downloads a profile in an over the air (OTA) manner to allow a user to change an operator (e.g., a mobile network operator (MNO)). Furthermore, one eUICC or eSIM may support a plurality of profiles.

SUMMARY

The present disclosure has been made to address at least the above-mentioned problems and disadvantages, and to provide at least the advantages described below.

Accordingly, an aspect of the present disclosure is to provide a method for managing a profile of an electronic device and an electronic device supporting the same.

Accordingly, another aspect of the present disclosure is to generate profile extended information associated with a profile installed on a secure memory, in a memory independent of the secure memory, and manage the profile extended information, thereby making it possible, even though the profile is inactivated, to use information associated with the inactivated profile.

Accordingly, another aspect of the present disclosure is to utilize profile extended information stored in the memory, thereby reducing a time needed for profile switching or network registration.

Accordingly, another aspect of the present disclosure is to select the most suitable wireless network AP at a current state, thereby improving user convenience.

In accordance with an aspect of the present disclosure, an electronic device is provided. The electronic device includes a secure memory including at least one profile, a processor configured to generate profile extended information for each of the at least one profile, based on profile information, a memory configured to store the profile extended information, and a communication interface configured to perform a network search, where the processor is configured to update the profile extended information, based on network information obtained by the network search. In accordance with another aspect of the present disclosure, a method for operating an electronic device is provided. The method includes generating profile extended information for a profile, based on profile information of the profile installed on a secure memory of the electronic device, checking profile extended information of a target profile if a profile switch event occurs, and performing network registration for the target profile based on a result of the checking.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
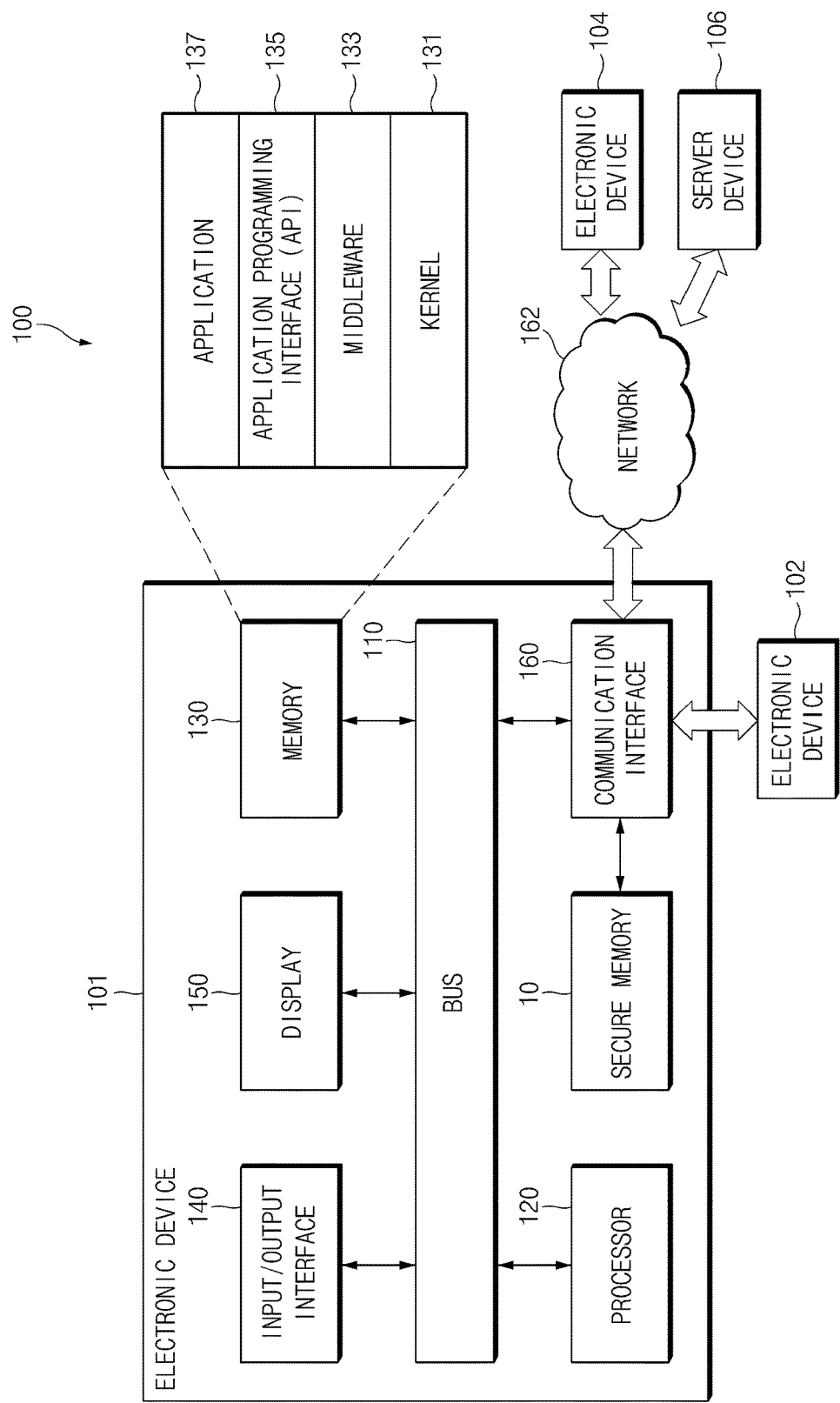
FIG. 1 is a block diagram of a configuration of an electronic device, according to an embodiment of the present disclosure.

Various embodiments of the present disclosure are described with reference to accompanying drawings. Accordingly, those of ordinary skill in the art will recognize that modifications, equivalents, and/or alternatives on the various embodiments described herein can be made without departing from the scope and spirit of the present disclosure. With regard to description of drawings, similar components may be marked by similar reference numerals.

As used herein, the expressions "have", "may have", "include" and "comprise", or "may include" and "may comprise" indicate the existence of corresponding features (e.g., elements such as numeric values, functions, steps, or components) but do not exclude the presence of additional features.

As used herein, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where A is included, the case (2) where B is included, or the case (3) where both A and B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing from the scope of the present disclosure, a first element may be referred to as a second element, and similarly, a second element may be referred to as a first element.

It will be understood that when an element (e.g., a first element) is referred to as being "(operatively or communicatively) "coupled with/to" or "connected to" another element (e.g., a second element), the element can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding step or a generic-purpose processor (e.g., a central processing unit (CPU) or an application processor) which may perform corresponding steps by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are defined in the specification, they may not be interpreted to exclude embodiments of the present disclosure.

An electronic device, according to various embodiments of the present disclosure, may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to various embodiments of the present disclosure, the electronic devices may be smart home appliances. The smart home appliances may include at least one of televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like), magnetic resonance angiography (MRA) machines, magnetic resonance imaging (MRI) machines, computed tomography (CT) machines, scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sale (POS) machines, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of furniture or buildings/structures, electronic boards, electronic signature receiving devices, projectors, or various measuring instruments (e.g., water meters, electricity meters, gas meters, or wave meters, and the like).

The electronic devices, according to an embodiment of the present disclosure, may be one or more combinations of the above-mentioned devices.

According to an embodiment of the present disclosure, an electronic device may be a flexible electronic.

Also, electronic devices, according to various embodiments of the present disclosure, are not limited to the above-mentioned devices, and may include new electronic devices according to the development of new technologies.

Hereinafter, electronic devices, according to an embodiment of the present disclosure, will be described with reference to the accompanying drawings. The term "user" used herein may refer to a person who uses an electronic device or may refer to a device (e.g., an artificial intelligence electronic device) that uses an electronic device.

FIG. 1 is a block diagram of a configuration of an electronic device, according to an embodiment of the present disclosure.

Referring to FIG. 1, an electronic device 101 in a network environment 100, according to various embodiments of the present disclosure, is provided. The electronic device 101 includes a secure memory 10, a bus 110, a processor 120, a memory 130, an input/output (I/O) interface 140, a display 150, and a communication interface 160. According to an embodiment, the electronic device 101 may not include at least one of the above-described components or may further include other components.

The secure memory 10 includes an independent operating system (OS) and stores and deletes at least one profile. A profile (a mobile network operator (MNO) profile) may be a subscriber identifier module which is able to be downloaded or deleted on or from the secure memory 10. The profile contains information, such as service operator information, roaming information, authentication information (IMSI and the like), subscriber information (ICCID and the like). The profile may be downloaded on the secure memory 10 in an OTA manner. One profile may correspond to a removable SIM card. The secure memory 10 may store a plurality of profiles, and the electronic device 101 may use different network services, which a plurality of operators provides, using the plurality of profiles installed on the secure memory 10. Since the secure memory 10 is mounted in the electronic device 101 in the form of a chip during the process of manufacturing the electronic device 101, the secure memory 10 may not be removed by a user.

The secure memory 10 includes a variety of authentication information (a private key) associated with downloading, installing, and managing a profile, a public key, a certificate, a keyset for updating the certificate, and the like, and may provide a secure OTA channel or network authentication algorithm.

The secure memory 10 may include a eUICC, an embedded secure element (eSE), a micro secure digital (SD), and the like. A standard platform, an internal structure, connected units, and the like of the secure memory 10 may vary.

For example, if implemented with the eUICC, the secure memory 10 may be connected with a communication processor (CP) (e.g., the communication interface 160), and thus a global platform according to the eUICC standard may be applied to the secure memory 10.

Alternatively, if implemented with the eSE, the secure memory 10 may be connected with a near field communication (NFC) module, and thus a global platform according to the eSE standard may be applied to the secure memory 10.

Alternatively, if implemented based on the TrustZone®, the secure memory 10 may correspond to a separate secure area (e.g., a secure world) independent of a normal area (e.g., a normal world) with respect to one physical processor (or a processor core) and may have a central processing unit, a register, an address space, a memory, a device, an operating system, and the like which are separated from the normal world. However, the scope and spirit of the present disclosure may not be limited thereto. For example, the secure memory 10 may include all secure areas capable of storing and deleting at least one profile.

The bus 110 interconnects the above-described components 110 to 160 and is a circuit for conveying communications (e.g., a control message and/or data) among the above-described components.

The processor 120 includes one or more of a CPU, an application processor (AP), or a CP. The processor 120 performs data processing or an operation associated with control or communication of at least one other component of the electronic device 101.

The processor 120 generates and manages profile extended information associated with a corresponding profile, based on at least a part of pieces of information of the profile installed on the electronic device 101.

The processor 120 checks whether the profile extended information includes information associated with received information. That is, when the profile is switched, the processor 120 receives information associated with the switched profile and checks whether profile extended information associated with the switched profile exists. In this case, the communication interface 160 may immediately perform registration in a network of a profile to be switched, using the profile extended information associated with the changed profile without a network search.

The processor 120 obtains wireless network access point (AP) information from the communication interface 160 and checks whether information associated with the obtained AP information exists, from the profile extended information. In this case, the processor 120 checks whether connection to an AP is possible, determines an authentication method of the AP, and the like, through the profile extended information, and if needed, the processor 120 allows a profile of the electronic device 101 to switch into a profile associated with a corresponding AP.

Based on the profile extended information, the processor 120 issues a profile switch event such that profile switching is initiated or the processor 120 may perform scheduling of the profile associated with the profile switching. For example, the processor 160 may allow profile switching to be performed according to a location of the electronic device 101 or a time, through the profile switch event or the scheduling of the profile. The profile switch event may indicate a start of a profile switch procedure or may indicate that the profile switching is complete. For example, the profile switch event may occur based on at least one of profile scheduling by a profile scheduler 230, a setting of the electronic device 101, a user input, a setting of a profile operator, a change of a network state, a profile state, profile information, or profile extended information.

The processor 120 installs the profile, downloaded through the communication interface 160, in the secure memory 10. The processor 120 may delete the profile installed in the secure memory 10 or may manage a profile state (active or inactive).

The processor 120 may switch from the profile being currently used to one of a plurality of profiles included in the secure memory 10. For example, the processor 120 performs the profile switch procedure using extended information.

If the electronic device 101 receives an authentication request from a corresponding AP while attempting to connect to a Wi-Fi AP through the communication interface 160, the processor 120 checks the profile extended information and performs authentication. For example, the processor 120 may receive a service set identifier (SSID) of a corresponding AP through the communication interface 160 and check whether information corresponding to the SSID exists, from the profile extended information.

The electronic device 101 maintains connection with the Wi-Fi AP through the communication interface 160 and checks the profile extended information of a corresponding AP. For example, in the case where a result of checking the profile extended information of a corresponding AP indicates that the corresponding AP performs SIM authentication, the electronic device 101 may switch from the profile activated thereon to a profile associated with the corresponding AP and complete the authentication. Afterwards, the communication interface 160 attempts to connect to the Wi-Fi AP.

According to the SIM authentication an authentication value (e.g., a signed response (SRES)) is generated using an authentication key and authentication algorithm of a corresponding profile, the generated authentication value is transmitted to an authentication server, and a value directly generated by the authentication server is compared with the authentication value received from the electronic device 101 for authentication. For example, the authentication value generated from the electronic device 101 is stored in the memory 130 in a state where it is included in the profile extended information of a corresponding profile.

The memory 130 may include a volatile and/or nonvolatile memory. The memory 130 stores instructions or data associated with at least one other component of the electronic device 101. The memory 130 may store software and/or a program. The program includes, for example, a kernel 131, a middleware 133, an application programming interface (API) 135, and/or an application (or an application program) 137. At least a portion of the kernel 131, the middleware 133, or the API 135 may be called an "operating system (OS)".

The memory 130 stores profile extended information about each of at least one profile usable on the electronic device 101, independently of the secure memory 10. Alternatively, the profile extended information may be stored in an internal memory of the processor 120 which generates and manages the profile extended information.

The memory 130 stores the profile extended information in a secure area to prevent a user or an external device from easily accessing the profile extended information. The secure area may correspond to an area independent of the secure memory 10 which stores at least one profile.

The electronic device 101 may further include a SIM slot, and the memory 130 may store the profile extended information using subscriber information included in the SIM card inserted into the SIM slot as one profile.

The kernel 131 controls or manages system resources (e.g., the bus 110, the processor 120, the memory 130, and the like) that are used to execute steps or functions of other programs (e.g., the middleware 133, the API 135, and the application 137). Furthermore, the kernel 131 provides an interface that allows the middleware 133, the API 135, or the application program 137 to access discrete components of the electronic device 101 so as to control or manage system resources.

The middleware 133 performs a mediation role such that the API 135 or the application program 137 communicates with the kernel 131 to exchange data.

Furthermore, the middleware 133 processes task requests received from the application 137 according to a priority. For example, the middleware 133 assigns a priority, which makes it possible to use a system resource (e.g., the bus 110, the processor 120, the memory 130, or the like) of the electronic device 101, to at least one of the application 137. The middleware 133 processes the one or more task requests according to the priority assigned to the at least one application 137, which makes it possible to perform scheduling or load balancing on the one or more task requests.

The API 135 is an interface through which the application 137 controls a function provided by the kernel 131 or the middleware 133, and includes, for example, at least one interface or function (e.g., an instruction) for a file control, a window control, image processing, a character control, or the like.

The I/O interface 140 transmits an instruction or data, input from a user or another external device, such as a first external electronic device 102, a second external electronic device 104, or a server device 106, to other components of the electronic device 101. Furthermore, the I/O interface 140 may output an instruction or data, received from other components of the electronic device 101, to a user or another external device, such as the first external electronic device 102, the second external electronic device 104, or the server device 106.

The display 150 includes, for example, a liquid crystal display (LCD), a light-emitting diode (LED) display, an organic LED (OLED) display, or a microelectromechanical systems (MEMS) display, or an electronic paper display. The display 150 displays various contents (e.g., a text, an image, a video, an icon, a symbol, and the like) to a user. The display 150 may include a touch screen and may receive, for example, a touch, gesture, proximity, or hovering input using an electronic pen or a portion of a user's body.

The communication interface 160 establishes communication between the electronic device 101 and the first external electronic device 102, the second external electronic device 104, or the server device 106. For example, the communication interface 160 may be connected to a network 162 through wireless communication or wired communication to communicate with the first external electronic device 104 or the server device 106).

The wireless communication includes at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as a cellular communication protocol.

Furthermore, the wireless communication may include, for example, a local area network. The local area network includes, for example, at least one of Wi-Fi (Wireless Fidelity), Bluetooth, NFC, global positioning system (GPS), or the like.

The wired communication includes at least one of, for example, a universal serial bus (USB), a high definition multimedia interface (HDMI), a recommended standard-132 (RS-132), or a plain old telephone service (POTS).

The network 162 includes at least one of telecommunications networks, for example, a computer network (e.g., LAN or WAN), an Internet, or a telephone network.

The communication interface 160 searches for a network usable at a current location of the electronic device 101. According to various embodiments, the communication interface 160 searches for a network periodically or non-periodically. For example, the communication interface 160 searches for a network in response to the profile switch event. The communication interface 160 performs network registration in response to the network search result.

Each of the first external electronic device 102 and the second external electronic device 104 may be a device of which the type is different from or the same as that of the electronic device 101.

The server device 106 may include a group of one or more servers.

All or a part of steps that the electronic device 101 will perform may be executed by one or more other electronic devices, such as the first external electronic device 102, the second external electronic device 104, and the server device 106.

In the case where the electronic device 101 executes any function or service automatically or in response to a request, the electronic device 101 may not perform the function or the service internally, but, alternatively or additionally, the electronic device 101 may request at least a portion of a function associated with the electronic device 101 from another device, such as the first external electronic device 102, second external electronic device 104, or the server device 106. In this case, the other electronic device executes the requested function or additional function and transmits the execution result to the electronic device 101. The electronic device 101 may provide the requested function or service using the received result or may additionally process the received result to provide the requested function or service. To this end cloud computing, distributed computing, or client-server computing may be used.

Figure 2:
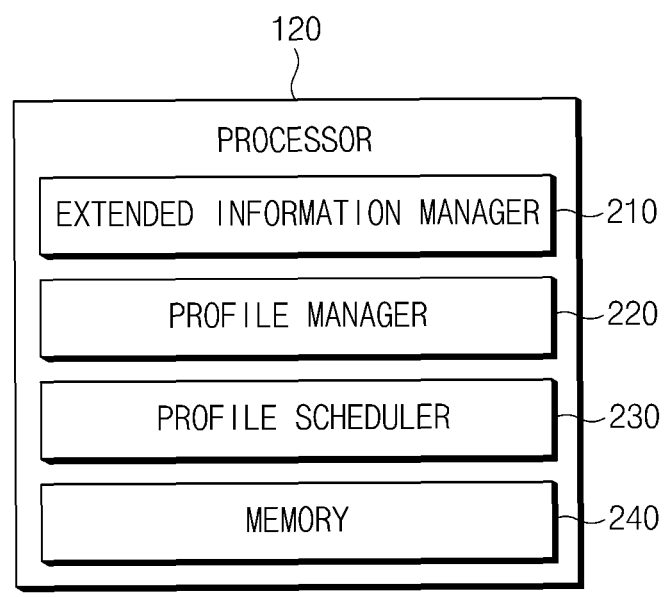
FIG. 2 is a block diagram of a processor of an electronic device, according to an embodiment of the present disclosure.

FIG. 2 is a block diagram of a processor of an electronic device, according to an embodiment of the present disclosure.

Referring to FIG. 2, the processor 120 is provided. The processor 120 includes an extended information manager 210, a profile manager 220, a profile scheduler 230, and a memory 240.

If at least one profile is installed on the secure memory 10, the extended information manager 210 generates profile extended information based on at least one piece of information included in the installed profile (hereinafter referred to as "profile information") (e.g., operator information, public land mobile network (PLMN) information, roaming information, authentication information, subscriber information, and the like). The extended information manager 210 stores the profile information and additional information, obtained based on the profile information, as the profile extended information. For example, the extended information manager 210 may obtain network information, such as a usable network obtained by a network search, a time when the network search is performed, a location where the network search is performed, and the like, with respect to a corresponding profile or an operator of the corresponding profile and stores the obtained network information and the profile information as the profile extended information. The profile extended information includes, for example, operator information, PLMN information, network information, radio access technology (RAT) information, an SSID, an authentication method of the SSID (ID/PW, MAC address, and SIM authentication), and the like. The profile extended information is generated for a profile installed on the secure memory 10 and is stored in a storage space (e.g., the memory 130, the memory 240 included in the processor 120, or an internal memory of the extended information manager 210) independent of the secure memory 10. For descriptive convenience, it may be assumed that the memory 130 stores the profile extended information.

The extended information manager 210 manages the profile extended information for a profile installed on the secure memory 10. For example, the extended information manager 210 may correct or update the profile extended information stored in the memory 130, based on switch to a different profile, a network search result, and the like. For example, if profile information of the profile installed in the secure memory is changed after the profile extended information is generated, the extended information manager 210 may correct the profile extended information stored in the memory 130 based on the changed profile information.

The extended information manager 210 manages the profile extended information periodically. For example, the extended information manager 210 may allow the communication interface 160 to perform network search every specific time. For example, the extended information manager 210 transmits a trigger signal to the communication interface 160 based on a discontinuous reception (DRX) period of an operator network currently registered. The communication interface 160 searches for networks existing at a current location of the electronic device 101 in response to the trigger signal and may update profile extended information of an operator of a corresponding network with network information obtained as the network search result.

The extended information manager 210 may manage the profile extended information non-periodically. For example, if a specific function (e.g., Wi-Fi network connection, network search, or the like) is performed on the electronic device 101, the profile extended information may be updated with information used for the specific function, information obtained by the specific function, and the like.

The extended information manager 210 may determine whether to update the profile extended information by comparing information obtained by the specific function with the profile extended information stored in the memory 130. For example, if network information obtained by the network search, for example, is different from the network information stored in the memory 130, the extended information manager 210 updates previous network information included in the profile extended information with the newly obtained network information.

Alternatively, if a specific function (e.g., Wi-Fi network connection, network search, and the like) is performed on the electronic device 101, the extended information manager 210 may determine whether to update the profile extended information, based on a current time, a current location of the electronic device 101, and the like. For example, the extended information manager 210 may check at least one of an update time or a final network search time, and if a time interval between the current time and the checked time is greater than a threshold value, the extended information manager 210 transmits a trigger signal to the communication interface 160 such that additional network search is performed. As another example, the extended information manager 210 may check at least one of an update location or a final network search location, and if a distance between the current location and the checked location is greater than a threshold value, the extended information manager 210 transmits the trigger signal to the communication interface 160.

The extended information manager 210 may provide another module of the electronic device 101 with at least a part of the profile extended information stored in the memory 130. For example, when an activated profile is switched in the secure memory 10, the profile manager 220 receives profile extended information associated with a profile to be switched or network information included in the profile extended information from the extended information manager 210 and immediately registers the electronic device 101 in a network corresponding to the profile to be switched using the received information without the network search.

For example, in a state where the electronic device 101 is registered in a first operator network by an activated profile A, the communication interface 160 searches for a network periodically or non-periodically, and the extended information manager 210 updates the profile extended information stored in the memory 130 with the network information obtained by the network search. For example, if second network information (e.g., 450-08 3G) corresponding to a second operator network and third network information (e.g., 450-06 4G) corresponding to a third operator network are found as the network search result, the extended information manager 210 updates profile extended information of a second profile, including information of a second operator, from among the profile extended information stored in the memory 130 with the second network information (e.g., 450-08 3G) and updates profile extended information of a third profile, including information of a third operator, from among the profile extended information stored in the memory 130 with the third network information (e.g., 450-06 4G). After the profile extended information is updated, in the case of switching to the second profile using the second operator network on the electronic device 101, the electronic device 101 immediately attempts to register in the second operator network based on the second network information (e.g., 450-08 3G) included in the profile extended information of the second profile, without needing to again search for the network.

If there is a need to update the profile extended information, the extended information manager 210 may not provide the profile extended information to the profile manager 220. For example, the extended information manager 210 may not provide the profile extended information to the profile manager 220 based on at least one of update information (e.g., a update time, a update location, and the like) of the profile extended information or a network search history (e.g., a last network search time, a last network search location, and the like). For example, if a update location of the profile extended information is spaced by a threshold value or more from a current location of the electronic device 101, the extended information manager 210 does not provide the profile extended information, stored in the memory 130, to the profile manager 220, but transmits a trigger signal to the communication interface 160 to perform an additional network search. In this case, the profile manager 220 performs network registration using network information checked through the additional network search of the communication interface 160, not the network information included in the profile extended information.

The extended information manager 210 checks whether desired information is included in the profile extended information stored in the memory 130. For example, the extended information manager 210 receives at least a part of the network information from the communication interface 160 and checks whether received information or information associated with the received information is included in the profile extended information. Afterwards, the extended information manager 210 provides the checked result or the profile extended information associated with the received information to the communication interface 160 or generates a profile switch event to switch to a profile associated with the received information. This will be in detail described with reference to FIG. 4.

The extended information manager 210 may issue the profile switch event based on the profile extended information. For example, the extended information manager 210 may issue the profile switch event such that profile switching is made according to a location of the electronic device 101. For example, in the case where a location is limited to use a specific profile (e.g., no international roaming), the extended information manager 210 checks the location limit of a profile through profile extended information of a corresponding profile stored in the memory 130. Information associated with the location limit of a corresponding profile may be included in the profile extended information when the extended information manager 210 generates or updates the profile extended information. Similarly, in the case where a time is limited to use a corresponding profile with regard to the profile extended information stored in the memory 130, the extended information manager 210 may issue the profile switch event such that profile switching is performed according to a time. Alternatively, the extended information manager 210 may check a limit on the use of the specific profile due to delay of a service fee by a user, security, service check, and the like, based on the profile extended information and may issue the profile switch event based on the profile extended information.

Accordingly, even though a profile is inactivated, the electronic device 101 may use information associated with a corresponding profile using the profile extended information stored in the memory 130 without connecting to the secure memory 10 or activating the profile.

The profile manager 220 installs a profile, downloaded through the communication interface 160, in the secure memory 10. Additionally, the profile manager 220 may delete the profile installed in the secure memory 10 or may manage a profile state (active or inactive).

The profile manager 220 may switch from a profile being currently used to one of a plurality of profiles included in the secure memory 10. For example, in response to a profile switch event, the profile manager 220 switches from the currently used profile to a specific profile (e.g., a target profile included in the profile switch event, a profile selected based on network information included in the profile extended information, and the like) or a default profile. The default profile corresponds to a profile which is usable when a specific profile does not exist.

The profile switch event may indicate a start of a profile switch procedure or that that profile switching is complete. For example, the profile switch event may be initiated based on at least one of profile scheduling of the profile scheduler 230, a setting of the electronic device 101, a user input, a setting of a profile operator, a change of a network state, a profile state, profile information, or profile extended information.

For example, if that a signal strength of a network corresponding to a currently registered profile which is smaller than a threshold value is detected through the communication interface 160, the profile manager 220 may receive the profile switch event. In this case, the profile manager 220 selects a profile to be switched, based on the profile extended information. The profile extended information may have network information (e.g., a network priority) obtained by the network search, and in this case, the profile manager 220 selects the most recently updated network information based on the profile extended information and then switches from a currently used profile to the selected profile.

The profile manager 220 performs the profile switch procedure using the profile extended information obtained from the extended information manager 210. For example, the profile manager 220 checks the profile extended information (e.g., network information, network priority, and the like) associated with a profile to be switched prior to profile switching, and the profile manager 220 performs the profile switch procedure or checks profile extended information while performing the procedure for switching the profile.

The profile scheduler 230 performs profile scheduling such that profile switching is performed according to a specific condition (e.g., a specific place, a specific time, and the like). If the specific condition is satisfied, the profile scheduler 230 may issue the profile switch event such that a profile being used is switched. For example, if the electronic device 101 is located at a specific place (e.g., home, office, and the like), the profile scheduler 230 performs scheduling so as to switch to a profile B. Alternatively, if it is a specific time (e.g., an attendance time, a closing time, a weekend, and the like), the profile scheduler 230 performs scheduling so as to switch to the profile B. That is, if the electronic device 101 is located at a specific place or it is a specific time, the profile scheduler 230 issues a profile switch event for switching to the profile B, and the profile manager 220 switches from the currently used profile A to the profile B in response to the profile switch event. For example, the profile manager 220 receives profile extended information of the profile B from the extended information manager 210 in response to the profile switch event and switches from the currently used profile A to the profile B on the secure memory 10 based on the profile extended information.

The profile scheduler 230 may schedule a profile based on the profile extended information stored in the memory 130. For example, in the case where a location is limited to use a specific profile, the profile scheduler 230 may schedule the profile based on the profile extended information of a corresponding profile such that the profile switching is performed according to a location of the electronic device 101. Similarly, in the case where a time is limited to use a specific profile, the profile scheduler 230 may schedule the profile based on the profile extended information of a corresponding profile such that the profile switching is performed according to a time. That is, the profile scheduler 230 may issue the profile switch event based on a location of the electronic device 101 or a time.

The profile scheduler 230 may schedule a profile based on the profile switch history. For example, in the case where a switch frequency of a profile is greater than or equal to a specific frequency at a constant location or time, the profile scheduler 230 may schedule the profile such that the profile switching is performed at the constant location or time. Alternatively, the profile scheduler 230 may obtain the profile switch condition through the machine learning of the profile switch history and may schedule the profile such that the profile switching is performed according to the profile switch condition. Alternatively, the profile scheduler 230 receives a user input associated with whether to schedule the profile based on the profile switch history.

The profile scheduler 230 receives an input (e.g., a user input) associated with profile scheduling through the input/output interface 140. For example, the input associated with the scheduling includes a profile switch condition, a target profile (a profile to be used by profile switching), and the like.

An electronic device 101 includes a secure memory 10 including at least one profile, at least one processor 120 configured to generate profile extended information for a profile of the secure memory 10, based on profile information, a memory 130 configured to store the profile extended information, and a communication interface 160 configured to perform network search. The processor 120 updates the profile extended information for a profile, based on network information obtained by the network search.

When a profile switch event occurs, the communication interface 160 performs the network search, and the processor 120 updates the profile extended information based on network information obtained by the network search.

When a profile is switched, the communication interface performs network registration associated with the switched profile using the profile extended information.

The profile switch event may occur based on at least one of a setting of the electronic device 101, a user input, a setting of a profile operator, a network state, a profile state, profile information, or the profile extended information.

The processor 120 may not use the profile extended information to perform network registration associated with the switched profile, if a time interval between a final network search time of the communication interface 160 and a current time is greater than a threshold value or if a distance between a network search location and a current location of the electronic device 101 is greater than a threshold value.

The communication interface 160 performs searching of a wireless network access point (AP), and the processor 120 checks information associated with the found wireless network AP from the profile extended information.

The processor 120 determines an authentication method of the wireless network AP from information associated with the wireless network AP and switches from a profile of the electronic device 101 to a profile of an operator of the wireless network AP if the authentication method of the wireless network AP is SIM authentication.

When authentication of the wireless network AP is complete, the processor 120 switches from a profile of the electronic device 101 to a previous profile.

The processor 120 updates the profile extended information with an authentication value generated in authenticating the wireless network AP, and when the electronic device 101 re-connects to the wireless network AP, the processor 120 re-authenticates the wireless network AP based on the authentication value of the profile extended information.

The processor 120 obtains a list of wireless network APs usable at a current location of the electronic device 101 through the searching of the wireless network AP and adjusts a priority of each wireless network AP in the list based on the profile extended information.

The processor 120 obtains a list of wireless network APs usable at a current location of the electronic device through the searching of the wireless network AP and checks information associated with each wireless network AP in the list based on the profile extended information. Further, the electronic device 101 includes a display configured to display information associated with each wireless network AP in the list of the wireless network APs.

If a signal of a wireless network which the electronic device currently uses becomes weak, the communication interface 160 performs the searching of the wireless network AP, and the processor 120 provides notification that a wireless network of an operator different from an operator of the wireless network is usable, based on a result of the searching of the wireless network AP and the profile extended information.

Figure 3:
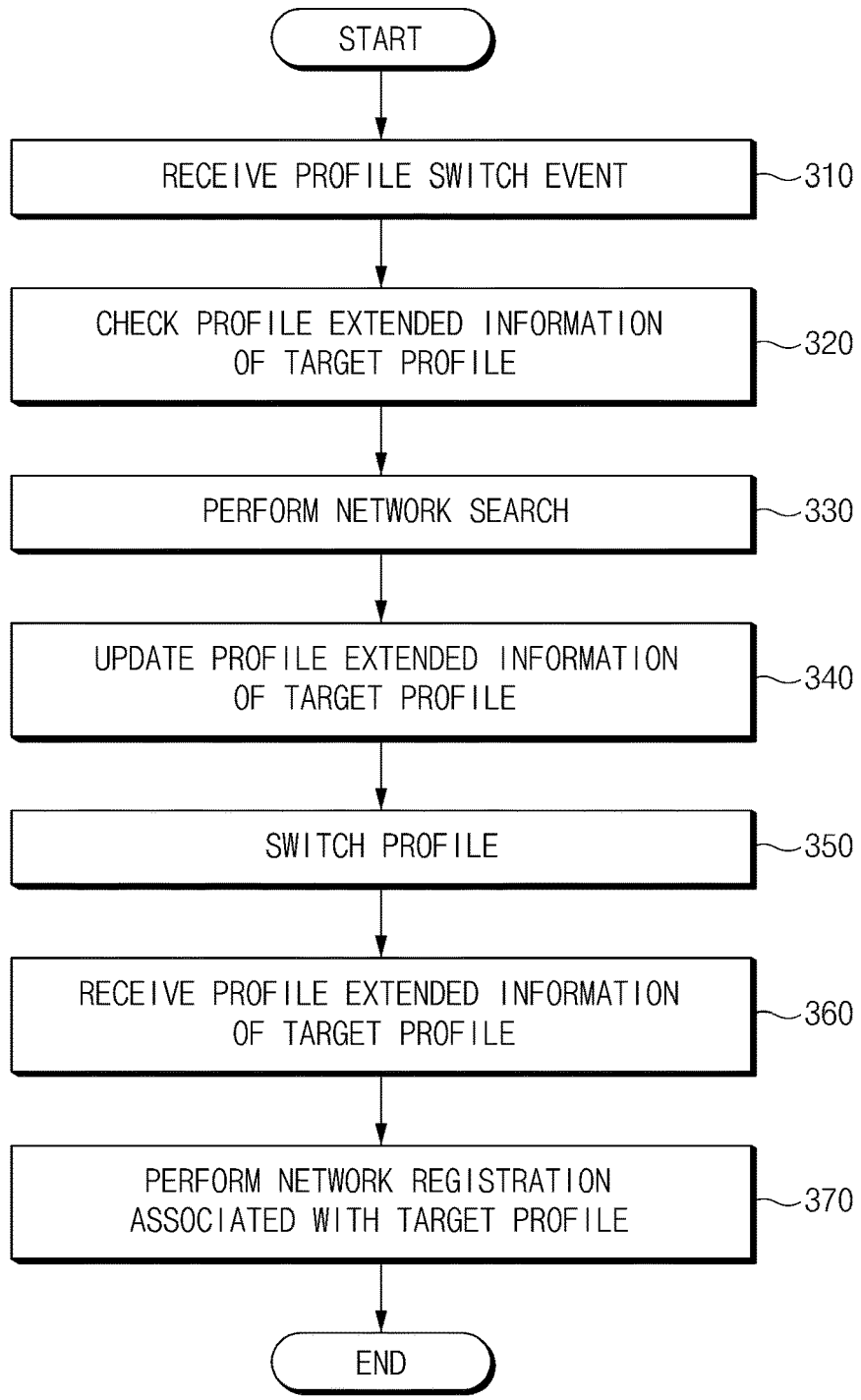
FIG. 3 is a flow chart of a method in which an electronic device switches a profile using profile extended information, according to an embodiment of the present disclosure.

FIG. 3 is a flow chart of a method in which an electronic device switches a profile using profile extended information, according to an embodiment of the present disclosure.

Referring to FIG. 3, a profile switch method of electronic device 101 is provided.

In step 310, the profile manager 220 receives a profile switch event. For example, the profile switch event includes information associated with a target profile to be switched. The extended information manager 210 provides the profile manager 220 with the profile extended information of the target profile in response to an input of the profile switch event.

In step 320, the profile manager 220 checks the profile extended information of the target profile to be switched. The profile manager 220 receives at least a part of the profile extended information of the target profile from the extended information manager 210. For example, at least a part of the received profile extended information includes operator information of the target profile, PLMN information, RAT information, and the like. The profile manager 220 may check the profile extended information associated with the target profile in advance and perform a profile switch procedure, or alternatively, the profile manager 220 may check the profile extended information while performing the procedure for switching a profile.

In step 330, the communication interface 160 performs a network search. The communication interface 160 searches for a network in response to a trigger signal received from the profile manager 220. The profile manager 220 may perform the network search in advance and perform the profile switch procedure, or alternatively, the profile manager 220 may perform the network search while performing the procedure for switching a profile.

In step 340, the extended information manager 220 updates the profile extended information of the target profile based on the network search result. The extended information manager 210 compares network information obtained by the network search with network information included in the profile extended information stored in the memory 130 and determines whether to update the profile extended information. For example, if the network information obtained by the network search is the same as the network information of the profile extended information, the extended information manager 210 does not update of the profile extended information. In contrast, if the network information obtained by the network search is different from the network information of the profile extended information, the extended information manager 210 updates previous network information included in the profile extended information with newly obtained network information.

In step 350, the profile manager 220 switches a profile of the secure memory 10. Accordingly, a profile being used becomes inactive (i.e., is in an inactive state), and the target profile becomes active (i.e., is in an activate state).

In step 360, the profile manager 220 receives profile extended information of the updated target profile from the extended information manager 210. The profile manager 220 checks updated network information (e.g., PLMN information, RAT information, and the like) included in the profile extended information.

In step 370, the profile manager 220 performs network registration associated with the target profile based on the profile extended information of the target profile. The profile manager 220 may use network information, which is included in the profile extended information stored in the memory 130, for immediate network registration without performing the network search.

Accordingly, the electronic device 101 may quickly perform the profile switch procedure using the profile extended information stored in the memory 130.

Figure 4:
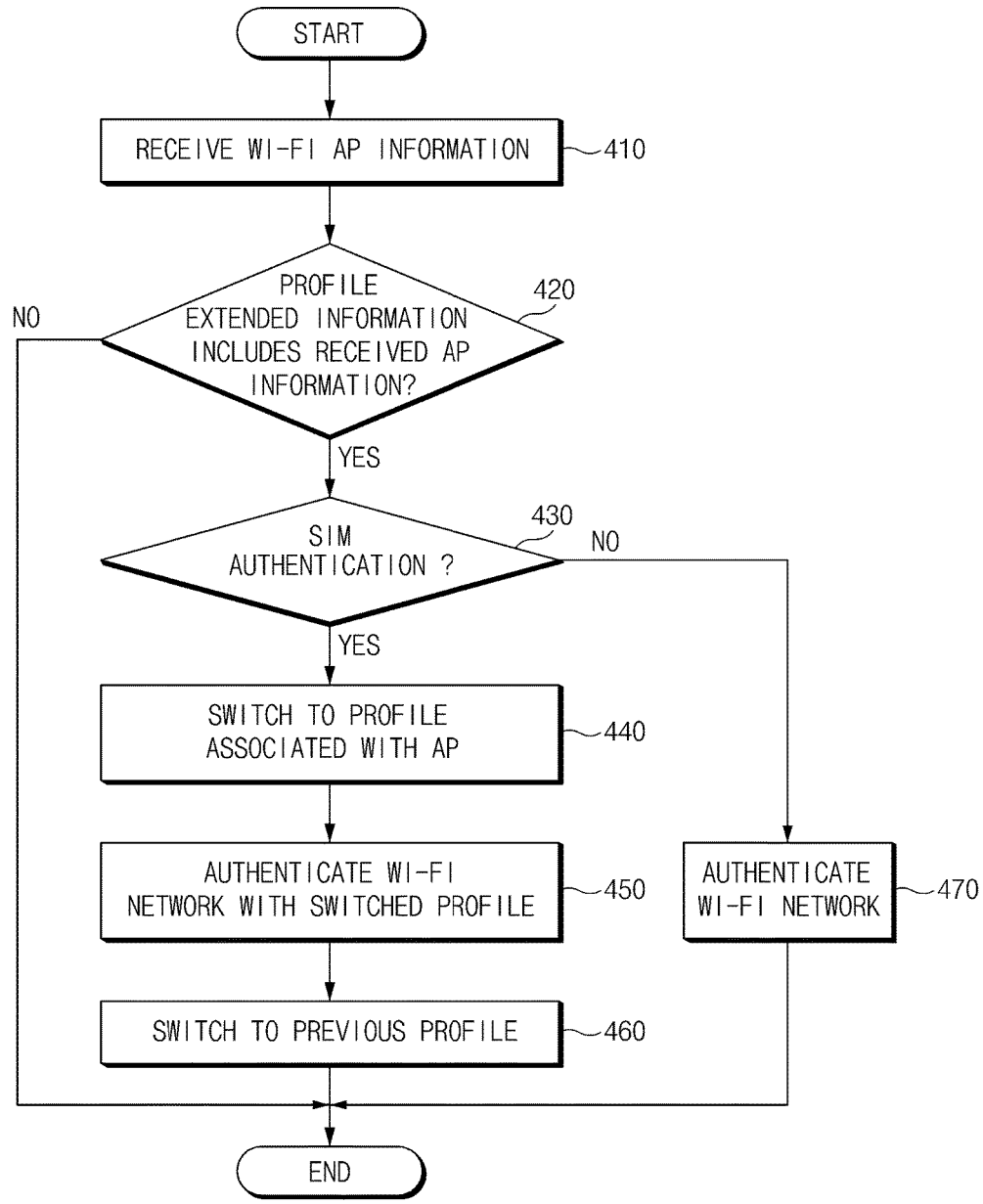
FIG. 4 is a flow chart of a method in which an electronic device connects to a Wi-Fi network using profile extended information, according to an embodiment of the present disclosure.

FIG. 4 is a flow chart of a method in which an electronic device connects to a Wi-Fi network using profile extended information, according to an embodiment of the present disclosure.

Referring to FIG. 4, a Wi-Fi connection method of electronic device 101 is provided.

In step 410, the extended information manager 210 receives Wi-Fi AP information. For example, the Wi-Fi AP information may include an SSID of an AP. For example, the Wi-Fi AP may be one, selected by a user, from among at least one AP found at a current location of the electronic device 101. However, the scope and spirit of the present disclosure may not be limited thereto. The Wi-Fi AP may be an AP which is selected based on a setting of the electronic device 101, a setting of the communication interface 160, a user input, a Wi-Fi selection history, a profile state, profile information, profile extended information, or the like. When the Wi-Fi AP is selected, the selected Wi-Fi AP information is transmitted to the extended information manager 210.

In step 420, the extended information manager 210 checks whether the profile extended information includes the received AP information. For example, the extended information manager 210 checks whether information associated with the received AP information (e.g., SSID) is included in the profile extended information stored in the memory 130. If the profile extended information includes the received AP information, the electronic device 101 performs step 430; if the profile extended information does not include the received AP information, the electronic device 101 terminates the procedure for connecting to the Wi-Fi AP using the profile extended information. Alternatively, the communication interface 160 maintains a connection with a corresponding Wi-Fi AP while the profile extended information is being checked through the extended information manager 210.

In step 430, the extended information manager 210 determines an authentication method of the received AP information from the profile extended information. If the authentication method of the AP is SIM authentication, the electronic device 101 performs step 440; otherwise, the electronic device 101 performs step 470.

If the authentication method of the AP is SIM authentication, in step 440, the profile manager 220 switches to a profile associated with a corresponding AP. Accordingly, a profile being used on the secure memory 10 is inactivated, and the profile associated with the corresponding AP is activated. It may be possible to verify or to confirm information associated with the profile using the profile extended information even though the profile is at an inactivation state, however, in SIM authentication, the profile should be activated for performing an authentication. The profile manager 220 may output a user interface, through the input/output interface 140 of the electronic device 101, used to confirm whether the profile switching should be performed. In this case, the profile manager 220 may switch the profile of the electronic device 101, based on selection by a user, through the user interface, confirming the profile switching. Alternatively, the profile manager 220 may automatically switch the profile of the electronic device 101, without confirming whether profile switching should be performed.

In step 450, the communication interface 160 performs Wi-Fi network authentication using the switched profile. If the Wi-Fi network authentication is complete, the communication interface 160 attempts to connect to a corresponding Wi-Fi AP. The electronic device 101 may directly connect to a corresponding Wi-Fi AP and may use a Wi-Fi service which an operator of the switched profile provides.

If the Wi-Fi network authentication is complete, in step 460, the profile manager 220 switches to a previous profile. Even though a profile of an operator providing the Wi-Fi service is again inactivated, the electronic device 101 may maintain a state in which the electronic device 101 connects to a corresponding Wi-Fi AP, because the Wi-Fi network authentication is complete.

In step 470, the communication interface 160 performs Wi-Fi network authentication using the profile extended information without profile switching. If the Wi-Fi network authentication is complete, the communication interface 160 may connect to a corresponding Wi-Fi AP.

Accordingly, the electronic device 101 may use a Wi-Fi service which an operator of a profile installed on the secure memory 10 provides. In the case where a plurality of profiles is installed on the electronic device 101, to use a Wi-Fi which a specific operator provides, information associated with a profile of the operator may be required, or the profile of the operator may remain in an active state. Even though the profile is at an inactive state, the electronic device 101 may quickly check information associated with the profile using profile extended information. Furthermore, the electronic device 101 may check whether profile switching was previously required, using the profile extended information and may switch a profile only in the case where the profile switching is required, thereby making it possible to efficiently use the Wi-Fi service that an operator of a profile installed on the secure memory 10 provides, thus improving user convenience.

A method for operating the electronic device 101 includes generating profile extended information for a profile, based on profile information of a profile installed on a secure memory 10 of the electronic device 101, checking profile extended information of a target profile if a profile switch event is occurred, and performing network registration about the target profile based on a result of the checking.

The method for operating the electronic device 101 further includes performing network search if the profile switch event is occurred, and updating profile extended information based on network information obtained by the network search. Performing the network registration includes performing network registration about the target profile using the updated profile extended information if a profile of the electronic device is switched to the target profile by the profile switch event.

Performing the network registration further includes performing network re-search if a time interval between a final network search time and a current time is greater than a threshold value or a distance between a network search location and a current location of the electronic device is greater than a threshold value, and performing network registration associated with the target profile using network information obtained by the network re-search.

The profile switch event occurs based on at least one of a setting of the electronic device, a user input, a setting of a profile operator, a network state, a profile state, profile information, or the profile extended information.

The method for operating the electronic device 101 further includes searching a wireless network AP, determining information associated with the wireless network AP obtained by the searching from the profile extended information, determining an authentication method of the wireless network AP from the profile extended information if information associated with the wireless network AP is checked, switching from a profile of the electronic device to a profile of an operator of the wireless network AP if the authentication method of the wireless network AP is SIM authentication, and switching from a profile of the electronic device to a previous profile if authentication of the wireless network AP is complete.

The method for operating the electronic device 101 further includes updating the profile extended information with an authentication value generated in authenticating the wireless network, and performing wireless network re-authentication based on the authentication value if the electronic device 101 again connects to the wireless network AP.

The method for operating the electronic device 101 further includes adjusting a priority of each wireless network AP in a list of wireless network APs obtained by the network search as being usable at a current location of the electronic device.

The method for operating the electronic device 101 further includes displaying associated information checked from the profile extended information for each wireless network AP, in a list of wireless network APs obtained by the network search as being usable at a current location of the electronic device.

The method for operating the electronic device 101 may further include performing the network search if a signal which the electronic device currently uses becomes weak, and informing that a wireless network of an operator different from an operator of the wireless network is usable, based on a result of the network search and the profile extended information.

Figure 5:
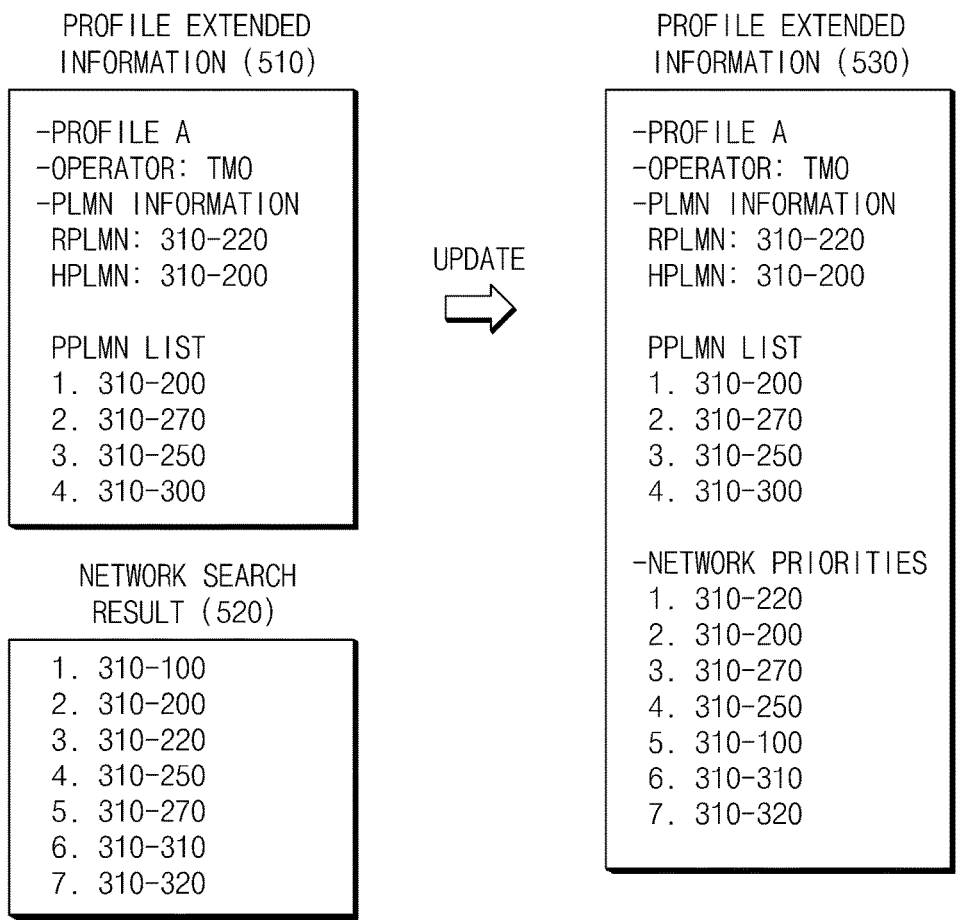
FIG. 5 illustrates contents of a screen of an electronic device in which profile extended information is updated based on a network search result, according to an embodiment of the present disclosure.

FIG. 5 illustrates contents of a screen of an electronic device in which profile extended information is updated based on a network search result, according to an embodiment of the present disclosure.

Referring to FIG. 5, profile extended information 510 is generated for a profile installed on the secure memory 10 and may be stored in the memory 130. Afterwards, the profile extended information may be periodically or non-periodically updated for a profile. The extended information manager 210 updates the profile extended information stored in the memory 130, based on a network search result. For example, the communication interface 160 performs a network search in response to occurrence of the profile switch event. A network usable at a current location of the electronic device 101 may be found as the network search result. The extended information manager 210 updates the profile extended information of the profile using a corresponding operator, based on the network search result. For example, the profile extended information 510 associated with a profile A installed on the secure memory 10 may be stored in the memory 130. The extended information manager 210 obtains a network search result 520 about a specific operator (e.g., Operator TMO as shown in FIG. 5) from the network search result obtained by the network search. A plurality of networks may be found with respect to the specific operator. If the network search result 520 is obtained, the extended information manager 210 updates the profile extended information 510 based on the network search result 520.

The extended information manager 210 may determine priorities between networks found through the network search and apply the determined network priorities to the profile extended information 510. For example, if a plurality of networks is found, the extended information manager 210 determines a network priority for network registration among the plurality of networks based on PLMN information (e.g., a registered PLMN (RPLMN), home PLMN (HPLMN), or preferred PLMN (PPLMN) list and the like) included in the profile extended information 510. Accordingly, updated profile extended information 530 including the network priorities is stored in the memory 130.

Afterwards, if the switch to the profile A is made on the secure memory 10, the electronic device 101 checks the updated profile extended information 530 of the profile A to register in a network of the TMO, being an operator of the profile A, and may immediately attempt to register in a network 310-220 having a highest network priority.

According to an embodiment, after the profile A is activated on the secure memory 10, the extended information manager 210 checks update information, a network search history, or the like of the profile extended information stored in the memory 130 and performs the network search again without using network information included in the profile extended information. For example, the extended information manager 210 allows the network search to be performed again if a time interval between an update time of the profile extended information and a current time is greater than a threshold value or a distance between an update location of the profile extended information and a current location is greater than the threshold value.

Figure 6:
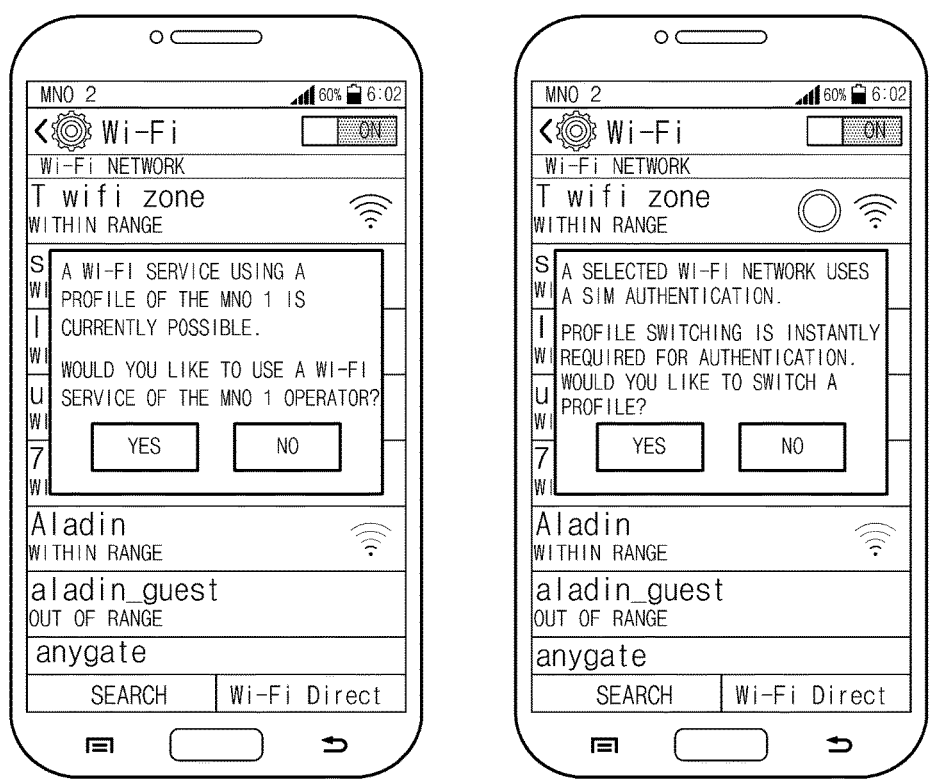
FIG. 6 illustrates screens of an electronic device displaying a process of connecting to a Wi-Fi network, which an operator of a profile of an inactive state provides, using profile extended information, according to an embodiment of the present disclosure.

FIG. 6 illustrates screens of an electronic device displaying a process of connecting to a Wi-Fi network, which an operator of a profile of an inactive state provides, using profile extended information, according to an embodiment of the present disclosure.

Referring to FIG. 6, one or more profiles may be installed on the electronic device 101, and the installed profiles may be activated according to a setting of the electronic device 101 or a selection of a user. For example, in the example shown in FIG. 6, a profile A of a first operator MNO 1, a profile B of a second operator MNO 2, and a profile C of a third operator MNO 3 are installed on the secure memory 10 of the electronic device 101. As shown in FIG. 6, operator MNO 2 is displayed at the top left corner of the screen of the electronic device 101 indicating that profile B associated with operator MNO2 is activated. Profile A and profile C are inactivated.

The communication interface 160 searches for a Wi-Fi AP usable at a current location of the electronic device 101. If the Wi-Fi AP usable at the current location of the electronic device 101 is obtained, the display 150 displays the obtained AP on a screen of the electronic device 101.

The communication interface 160 transmits Wi-Fi AP information (e.g., SSID) obtained as the search result to the extended information manager 210, and the extended information manager 210 checks whether the profile extended information stored in the memory 130 includes information which is the same as the received Wi-Fi AP information. If information included in the profile extended information is the same as the received Wi-Fi AP information, the extended information manager 210 either provides a notification that that a Wi-Fi service which an operator of a profile including AP information corresponding to the profile extended information provides is usable or immediately selects the corresponding Wi-Fi AP.

If the information included in the profile extended information is the same as the received Wi-Fi AP information while profile B of operator MNO 2 is activated, the electronic device 101 may select a Wi-Fi network (e.g., T wifi zone illustrated in FIG. 6) providing a Wi-Fi service of operator MNO 1.

Alternatively, the electronic device 101 may inform a user of the electronic device 101 that it is possible to connect to a Wi-Fi network of operator MNO 1 (e.g., T wifi zone), as shown in the first screen of FIG. 6, through a notice such as "A Wi-Fi service using a profile of the MNO 1 is currently possible. Would you like to use a Wi-Fi service of the MNO 1 operator?" If the user selects the use of the Wi-Fi service, a Wi-Fi AP providing the Wi-Fi service of operator MNO 1 may be selected on the electronic device 101.

If the information included in the profile extended information is the same as the Wi-Fi AP information and a corresponding Wi-Fi AP is selected, the extended information manager 210 determines an authentication method of the selected Wi-Fi AP from the profile extended information. In the above example, if the Wi-Fi network (e.g., T wifi zone of FIG. 6) of the MNO 1 is selected, the extended information manager 210 determines an authentication method of the Wi-Fi AP of the MNO 1 from the profile extended information.

If the Wi-Fi network of operator MNO 1 performs SIM authentication, the profile manager 220 initiates a profile switch procedure for switching from a current profile to a profile of an operator providing the selected Wi-Fi service. When the profile switch procedure starts, the electronic device 101 inactivates profile B of operator MNO 2 and activates profile A of operator MNO 1. Then, the electronic device 101 performs authentication needed for the Wi-Fi service of operator MNO 1. When the authentication is complete, the electronic device 101 inactivates profile A of operator MNO 1 and may again activate profile B of operator MNO 2.

Alternatively, the electronic device 101 may ask the user of the electronic device 101 whether to perform profile switching for authentication, through a notice such as "A selected Wi-Fi network uses SIM authentication. Profile switching is instantly required for authentication. Would you like to switch a profile?" as shown in the second screen of FIG. 6. For example, if a user selects profile switching, the profile manager 220 initiates the profile switch procedure for switching from a current profile to a profile of an operator providing the selected Wi-Fi service.

As described above, the electronic device 101 is able to quickly check the Wi-Fi AP information using the profile extended information and performs profile switching according to an authentication method, thereby efficiently providing the Wi-Fi service that an operator of a profile installed on the secure memory 10 provides.

Figure 7:
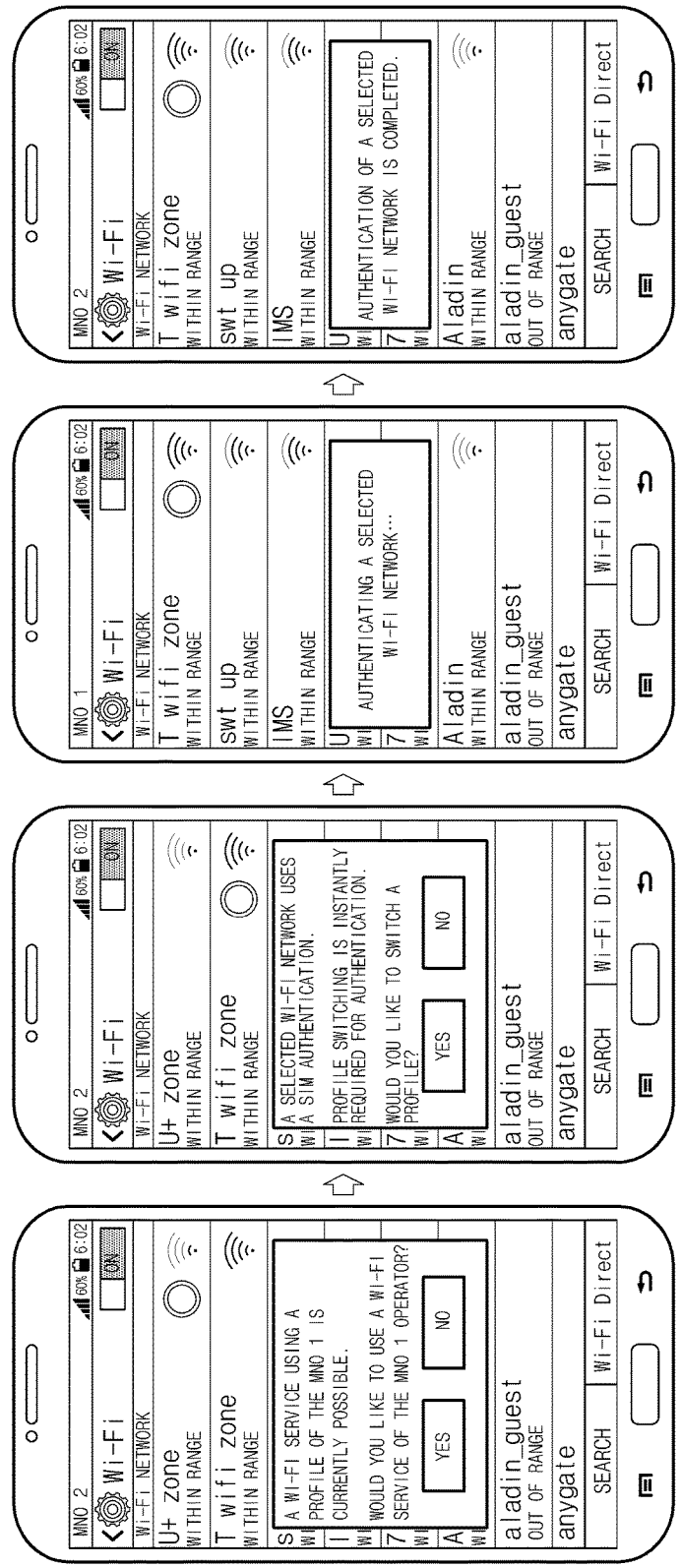
FIG. 7 illustrates screens of an electronic device displaying a process of connecting to a Wi-Fi network, which an operator of a profile of an inactive state provides, using profile extended information when a signal of the Wi-Fi network being currently used by the electronic device becomes weak, according to an embodiment of the present disclosure.

FIG. 7 illustrates screens of an electronic device displaying a process of connecting to a Wi-Fi network, which an operator of a profile of an inactive state provides, using profile extended information when a signal of the Wi-Fi network being currently used by the electronic device becomes weak, according to an embodiment of the present disclosure.

Referring to FIG. 7, a profile A of a first operator MNO 1, a profile B of a second operator MNO 2, and a profile C of a third operator MNO 3 are installed on the secure memory 10 of the electronic device 101. Referring to the first screen of FIG. 7, operator MNO 2 is displayed at the top left corner of the screen of the electronic device 101 indicating that profile B is activated. Profile A and profile C are inactivated.

When a signal of the Wi-Fi network which the electronic device 101 currently uses becomes weak, the communication interface 160 searches for a Wi-Fi AP usable at a current location of the electronic device 101. In this case, at least one Wi-Fi AP usable at a current location of the electronic device 101 may be obtained. For example, the Wi-Fi AP obtained through the Wi-Fi AP search may include a search-available public Wi-Fi AP other than the Wi-Fi AP that an operator of the profile installed on the secure memory 10 provides. The display 150 may display a Wi-Fi AP, obtained by the Wi-Fi AP search, on a screen of the electronic device 101. For example, the communication interface 160 may display a Wi-Fi AP usable at a current location, based on a signal strength.

If a new Wi-Fi AP other than the Wi-Fi AP to which the electronic device 101 currently connects is obtained, the communication interface 160 transmits the obtained Wi-Fi AP information (e.g., SSID) to the extended information manager 210, as described with reference to FIG. 6. The extended information manager 210 checks whether information included in the profile extended information is the same as information of the new Wi-Fi AP. If the information included in the profile extended information is the same as the new Wi-Fi AP information, the extended information manager 210 either provides a notification that a Wi-Fi service which an operator of a profile including AP information corresponding to the profile extended information is usable or immediately selects a corresponding Wi-Fi AP.

According to an embodiment, if a signal of a corresponding Wi-Fi network (e.g., U+ zone shown in FIG. 7) becomes weak while the electronic device 101 is using a Wi-Fi service, which operator MNO 2 provides, using the activated profile B, as shown at the first screen of FIG. 7, the communication interface 160 searches for a new Wi-Fi AP usable at a current location of the electronic device 101.

If a result of checking the profile extended information through the extended information manager 210 indicates that information included in the profile extended information of profile A is the same as information of a newly found Wi-Fi AP, the electronic device 101 provides a user notification that it is possible to connect to a Wi-Fi network of operator MNO 1 (e.g., T wifi zone), through a notice such as "A Wi-Fi service using a profile of the MNO 1 operator is currently possible. Would you like to use the Wi-Fi service of the MNO 1 operator?" For example, if a user selects the use of the Wi-Fi service, the Wi-Fi AP providing the Wi-Fi service of operator MNO 1 may be selected on the electronic device 101.

Alternatively, the electronic device 101 may immediately select an optimal Wi-Fi service (i.e., the Wi-Fi service of operator MNO 1 in the above example) according to a signal strength of the Wi-Fi network, without a notice informing that a Wi-Fi service using a profile of another operator is usable.

If information included in the profile extended information is the same as the Wi-Fi AP information and a corresponding Wi-Fi AP is selected, the extended information manager 210 determines an authentication method of the selected Wi-Fi AP from the profile extended information. In the above example, if the Wi-Fi network (e.g., T wifi zone) of operator MNO 1 is selected, as described with reference to FIG. 6, the extended information manager 210 determines an authentication method of the Wi-Fi AP of operator MNO 1 from the profile extended information.

If the Wi-Fi AP of the MNO 1 performs SIM authentication, the electronic device 101 may query a user of the electronic device 101 whether to perform profile switching for authentication, through a notice such as "A selected Wi-Fi network uses SIM authentication. Profile switching is instantly required for authentication. Would you like to switch a profile?" as shown in the second screen of FIG. 7. For example, if a user selects the profile switching, the profile manager 220 initiates the profile switch procedure for switching to a profile of an operator providing the selected Wi-Fi service.

Alternatively, the electronic device 101 may immediately start the profile switch procedure for switching to the profile of the operator providing the selected Wi-Fi service, without a notice informing the user that switching to a profile of another operator is required for the use of the selected Wi-Fi service.

If the profile switch procedure starts for authentication of the Wi-Fi network of operator MNO 1, the electronic device 101 inactivates profile B of operator MNO 2 and activates profile A of operator MNO 1. Afterwards, the electronic device 101 performs authentication of the Wi-Fi network of operator MNO 1 using the activated profile A. The electronic device 101 may display a notice, such as "Authenticating a selected Wi-Fi network . . . ", while performing authentication of the Wi-Fi network of operator MNO 1, as illustrated at the third screen of FIG. 7.

When the authentication of the Wi-Fi network of operator MNO 1 using profile A is complete, as shown at the top left corner of the fourth screen of FIG. 7, the electronic device 101 inactivates profile A of operator MNO 1 and activates profile B of operator MNO 2. As shown in the fourth screen of FIG. 7, the electronic device 101 may display a notice such as "Authentication of a selected Wi-Fi network is completed" and inform that authentication of the Wi-Fi network of the MNO 1 is complete.

As described above, when a signal of a Wi-Fi network which the electronic device 101 currently uses becomes weak, the electronic device 101 is able to quickly connect to a Wi-Fi network, which another operator of a profile installed on the secure memory 10 provides, using the profile extended information, and thus a user is able to conveniently utilize the Internet wirelessly without influence due to the weakness of a signal strength of a Wi-Fi network.

Figure 8:
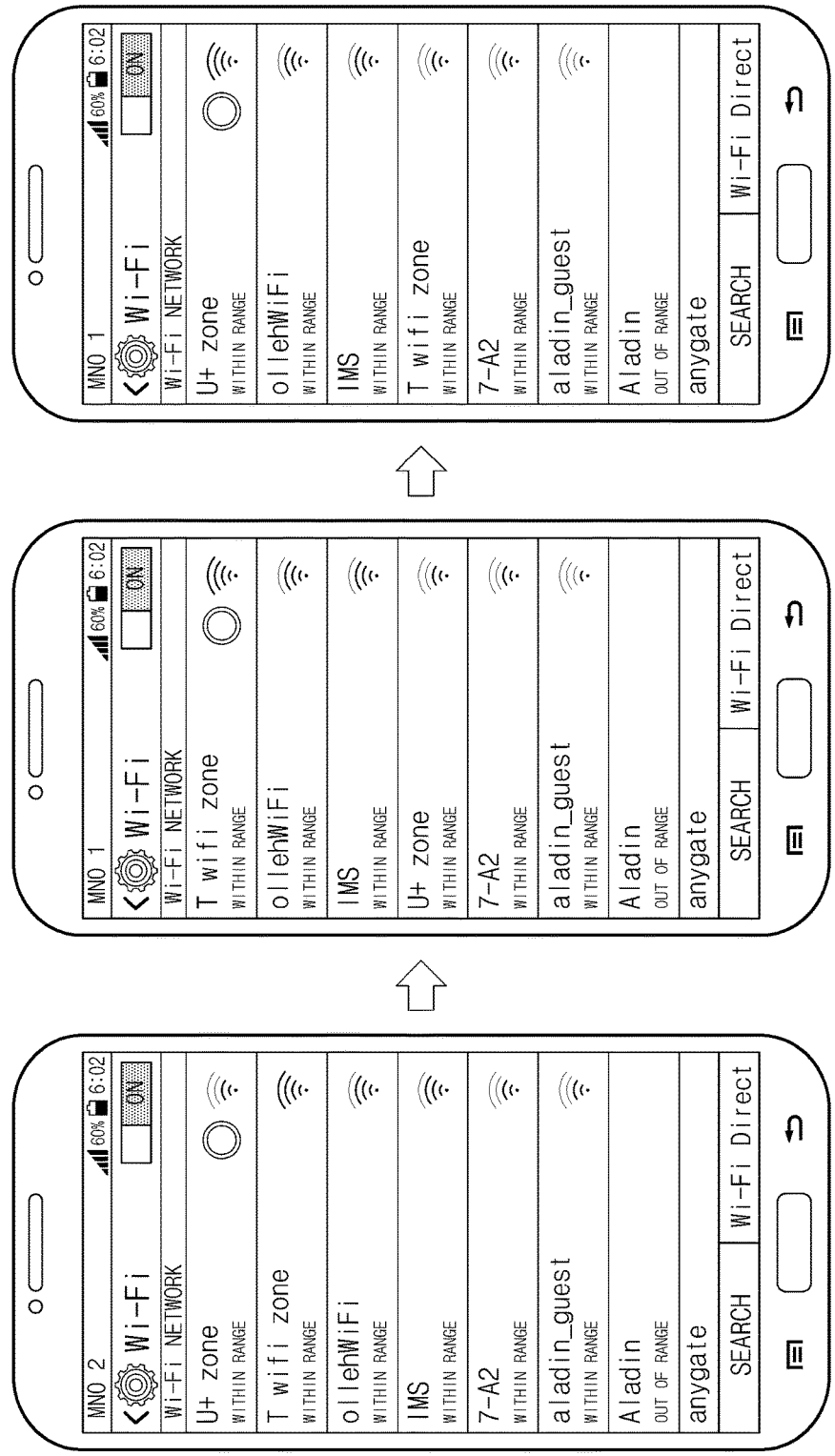
FIG. 8 illustrates screens of an electronic device displaying a process of re-authenticating a previously connected Wi-Fi network using profile extended information, according to an embodiment of the present disclosure.

FIG. 8 illustrates screens of an electronic device displaying a process of re-authenticating a previously connected Wi-Fi network using profile extended information, according to an embodiment of the present disclosure.

Referring to FIG. 8, a profile A of a first operator MNO 1, a profile B of a second operator MNO 2, and a profile C of a third operator MNO 3 are installed on the secure memory 10 of the electronic device 101. Referring to the first screen of FIG. 8, operator MNO 2 is displayed at the top left corner of the screen of the electronic device 101 indicating that profile B is activated. Profile A and profile C are inactivated.

The communication interface 160 may attempt to connect to a Wi-Fi AP, having a SIM authentication method, from among Wi-Fi APs usable at a current location of the electronic device 101. In this case, the electronic device 101 activates a corresponding profile and connects to the Wi-Fi AP by performing authentication of the Wi-Fi network of the Wi-Fi AP using the activated profile. The electronic device 101 stores Wi-Fi AP information (e.g., SSID) and a generated authentication value (e.g., SRES) in the memory 130 as profile extended information of a corresponding profile while performing authentication of the Wi-Fi network.

As shown in the first screen of FIG. 8, the electronic device 101 may connect to a Wi-Fi network (e.g., U+ zone illustrated in FIG. 8), which operator MNO 2 of profile B provides, from among Wi-Fi APs obtained by searching for Wi-Fi APs. For example, if the Wi-Fi network (e.g., U+ zone) of operator MNO 2 is selected by a user input, the electronic device 101 checks whether information included in the profile extended information is the same as Wi-Fi AP information (e.g., SSID) of the Wi-Fi network. If the information is the same, the electronic device 101 determines an authentication method of the Wi-Fi AP. If it is determined that the Wi-Fi AP uses SIM authentication, the electronic device 101 generates an authentication value (e.g., SRES) using an authentication key and authentication algorithm of the activated profile B and transmits the generated authentication value to an authentication server of operator MNO 2. When the authentication is complete, the electronic device 101 stores the generated authentication value in the memory 130 as the profile extended information of profile B.

Afterwards, the electronic device 101 may connect to another Wi-Fi network. The electronic device 101 may connect to a Wi-Fi network (e.g., T wifi zone of operator MNO 1 or ollehWiFi) of another operator or a search-available public Wi-Fi network (e.g., IMS, aladin_guest, shown in FIG. 8). For example, as illustrated in the second screen of FIG. 8, the electronic device 101 may connect to a Wi-Fi network (e.g., T wifi zone), which an operator MNO 1 of the profile A provides, in response to selection of a user or when a signal of the Wi-Fi network becomes weak (e.g., U+ zone). For example, if the Wi-Fi network of operator MNO 1 uses SIM authentication, the electronic device 101 may instantly activate profile A of operator MNO 1 and perform authentication of the Wi-Fi network. Alternatively, as indicated in the top left corner of the second screen of FIG. 8, if the electronic device has previously switched to the profile A, the electronic device 101 performs authentication of the Wi-Fi network using the profile A.

As described above, after connection to the Wi-Fi network (e.g., U+ zone illustrated in FIG. 8) of profile B is terminated due to connection to another Wi-Fi network, the electronic device 101 may again connect to a Wi-Fi network (e.g., U+ zone illustrated in FIG. 8) which the operator MNO 2 of profile B provides, as illustrated in the third screen of FIG. 8). If the Wi-Fi network (e.g., U+ zone) of operator MNO 2 is again selected, as described above, the electronic device 101 checks whether information included in the profile extended information is the same as Wi-Fi AP information (e.g., SSID) of the Wi-Fi network and determines an authentication method of a corresponding Wi-Fi AP. If the corresponding Wi-Fi AP uses SIM authentication, the electronic device 101 performs authentication of the Wi-Fi network. The electronic device 101 may further check an authentication value from the profile extended information, which was generated when previously connecting to the Wi-Fi network of operator MNO 2. Accordingly, even though profile B is inactivated, as indicated in the top left corner of the third screen of FIG. 8, the electronic device 101 may re-authenticate a corresponding Wi-Fi network using an authentication value stored in the profile extended information, without again activating the profile B.

Alternatively, as indicated in the top left of the second screen of FIG. 8, a profile of the electronic device 101 switches from the profile of operator MNO 2 to the profile of operator MNO 1. Even after switching to the profile A, the electronic device 101 is able to continue to use the Wi-Fi network of the MNO 2 (e.g., U+ zone). However, if an authentication timer of the Wi-Fi network of the MNO 2 (e.g., U+ zone) expires, the electronic device 101 may re-authenticate the Wi-Fi network. As indicated in the top left of the third screen of FIG. 8, even though profile B is inactivated, as described above, the electronic device 101 may re-authenticate a corresponding Wi-Fi network using an authentication value stored in the profile extended information of the profile B, without profile switching.

As described above, when re-authenticating a Wi-Fi network of a specific operator previously connected, the electronic device 101 uses an authentication value stored in the profile extended information, and thus the electronic device 101 is able to quickly connect to a corresponding Wi-Fi network without the complicated procedure for authenticating a Wi-Fi network.

Figure 9:
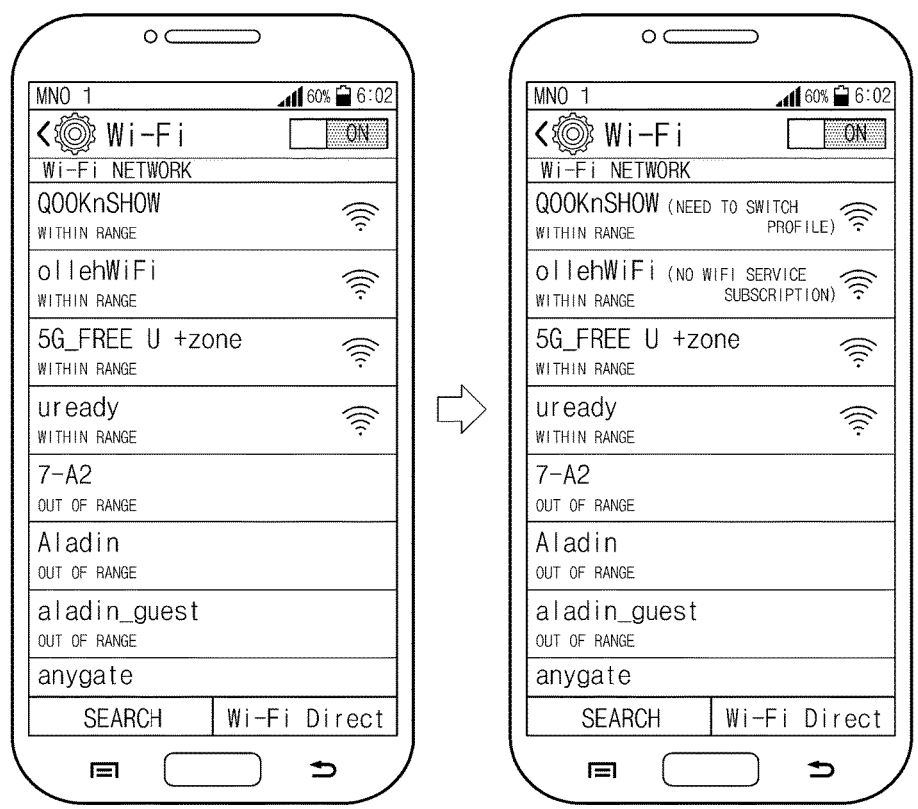
FIG. 9 illustrates screens of an electronic device displaying a list of Wi-Fi Access Points (APs) usable at a current location of the electronic device using profile extended information, according to an embodiment of the present disclosure.

FIG. 9 illustrates screens of an electronic device displaying a list of Wi-Fi Access Points (APs) usable at a current location of the electronic device using profile extended information, according to an embodiment of the present disclosure.

Referring to FIG. 9, the electronic device 101 searches for Wi-Fi APs usable at a current location of the electronic device 101 and displays a list of Wi-Fi APs obtained as the search result on a screen of the electronic device 101.

According to a conventional electronic device, as illustrated at a left screen of FIG. 9, the conventional electronic device may display IDs of found Wi-Fi APs and signal strengths of the found electronic devices in a list of Wi-Fi APs obtained as a result of searching for Wi-Fi APs.

As illustrated at a right screen of FIG. 9, the electronic device 101 provides AP information associated with the found Wi-Fi APs as well as the IDs or the signal strengths, in the Wi-Fi AP list.

When obtaining a list of Wi-Fi APs usable at a current location of the electronic device 101, the electronic device 101 checks for information from the profile extended information which is the same as information of the found Wi-Fi AP and displays information associated with the Wi-Fi AP in the Wi-Fi AP list. For example, the electronic device 101 determines an authentication method of the found Wi-Fi AP from the profile extended information and displays the authentication method of the Wi-Fi AP together with an ID of the Wi-Fi AP. Alternatively, the electronic device 101 may further check information associated with whether the Wi-Fi AP is usable, whether profile switching is required to use a corresponding Wi-Fi AP, and the like, based on the profile extended information and may further provide associated information together with the ID of the Wi-Fi AP.

In FIG. 9, a profile A of a first operator MNO 1, a profile B of a second operator MNO 2, and a profile C of a third operator MNO 3 are installed on the secure memory 10 of the electronic device 101. Operator MNO 1 is displayed at the top left corner of the screen of the electronic device 101 indicating that profile A, corresponding to operator MNO 1 is activated. Profile B and profile C are inactivated.

As shown in the right screen of FIG. 9, the electronic device 101 obtains a Wi-Fi AP list by searching for Wi-Fi APs. The electronic device 101 checks a Wi-Fi AP (e.g., QOOKnSHOW illustrated in FIG. 9) of operator MNO 3 and AP-related information, from the profile extended information of profile C. For example, the electronic device 101 checks that the Wi-Fi AP of operator MNO 3 uses SIM authentication, based on the profile extended information of the profile C. Since the profile A is currently activated, the electronic device 101 checks that switching to the profile of the MNO 3 is required, to perform authentication of a Wi-Fi network of the corresponding Wi-Fi AP. Accordingly, the electronic device 101 displays the authentication method together with ID and signal strength of a Wi-Fi AP in the Wi-Fi AP list or may display that profile switching is required.

The electronic device 101 checks a Wi-Fi AP (e.g., ollehWiFi illustrated in FIG. 9) of operator MNO 2 and AP-related information, from the profile extended information of profile C. For example, based on the profile extended information of the profile B, the electronic device 101 checks that since profile B does not subscribe to a Wi-Fi service, it is impossible to use a Wi-Fi service which operator MNO 2 provides. Accordingly, the electronic device 101 displays non-subscription to the Wi-Fi service together with ID and signal strength of a Wi-Fi AP in the Wi-Fi AP list or may display that it is not possible to use the Wi-Fi service.

As described above, the electronic device 101 displays AP-related information in the Wi-Fi AP list based on the profile extended information, thereby preventing unnecessary profile switching or an attempt to connect to an unusable Wi-Fi AP.

The electronic device 101 may adjust Wi-Fi AP priorities in a list of Wi-Fi APs obtained by Wi-Fi AP searching operation, based on the profile extended information. For example, in the case where the electronic device 101 directly selects a Wi-Fi AP, to which the electronic device 101 is able to connect without receiving a user input, from among a plurality of Wi-Fi APs obtained by the Wi-Fi AP searching operation, the electronic device 101 selects a Wi-Fi AP according to the adjusted priorities of the Wi-Fi AP list, based on the profile extended information.

For example, if profile A of operator MNO 1 and profile C of operator MNO 3 are installed on the electronic device 101, the electronic device 101 may obtain a Wi-Fi AP list including a Wi-Fi AP of operator MNO 1, a Wi-Fi AP of operator MNO 2, and a Wi-Fi AP of operator MNO 3, as a result of searching Wi-Fi APs. With regard to priorities of the Wi-Fi AP list, even though the Wi-Fi AP of operator MNO 2 has the strongest signal strength, the electronic device 101 may adjust a priority of the Wi-Fi AP of operator MNO 1 or the Wi-Fi AP of operator MNO 3 so as to be higher than the priority of the Wi-Fi AP of operator MNO 2, based on the profile extended information.

Alternatively, the electronic device 101 determines an authentication method of each AP from the profile extended information and adjusts priorities of the Wi-Fi AP list such that a Wi-Fi AP for which profile switching is not performed has a higher priority than a Wi-Fi AP which requires profile switching.

As described above, priorities of the Wi-Fi AP list may be adjusted based on the profile extended information, thereby making it possible to efficiently utilize a Wi-Fi service which an operator of a profile installed on the secure memory 10. Furthermore, it may be possible to improve user convenience.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a computer-readable storage media in the form of a program module.

According to various embodiments of the present disclosure, a computer-readable recording medium may be recorded with a program which, when executed on the computer, causes the computer to perform a method including generating profile extended information for a profile based on profile information of a profile installed on a secure memory 10 of an electronic device, performing network search if a profile switch event occurs, updating profile extended information based on network information obtained by the network search, and if a profile is switched by the profile switch event, performing network registration about the changed profile using the updated profile extended information.

A module or a program module according to various embodiments of the present disclosure may include at least one of the above elements, or a portion of the above elements may be omitted, or additional other elements may be further included. Operations performed by a module, a program module, or other elements may be executed sequentially, in parallel, repeatedly, or in a heuristic method. Also, a portion of operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a secure memory including at least one profile;
a memory configured to store profile extended information;
a communication interface configured to perform a network search and search a wireless network access point (AP); and
a processor configured to:
generate profile extended information for each of the at least one profile, based on profile information,
update the profile extended information based on network information obtained by a network search,
verify an authentication method of the wireless network AP from the profile extended information,
switch a first profile with a second profile of an operator of the wireless network AP, when the authentication method of the wireless network AP is subscriber identifier module (SIM) authentication, and
switch the second profile of the operator of the wireless network AP with the first profile, when authentication of the wireless AP is complete.

2. The electronic device of claim 1, wherein when a profile switch event occurs, the communication interface performs the network search and the processor updates the profile extended information based on the network information obtained by the network search.

3. The electronic device of claim 2, wherein the communication interface is further configured to perform network registration associated with the switched profile using the profile extended information, when a profile is switched.

4. The electronic device of claim 1, wherein the profile switch event occurs based on at least one of a setting of the electronic device, a user input, a setting of a profile operator, a network state, a profile state, the profile information, or the profile extended information.

5. The electronic device of claim 1 wherein the processor updates the profile extended information with an authentication value generated during the authentication of the wireless network AP, and
wherein the processor is further configured to re-authenticate the wireless network AP based on the authentication value of the profile extended information, when the electronic device re-connects to the wireless network AP.

6. The electronic device of claim 1, wherein the processor is further configured to obtain a list of wireless network APs usable at a current location of the electronic device through the search of the wireless network AP and to adjust a priority of each of the wireless network APs in the list based on the profile extended information.

7. The electronic device of claim 1, further comprising:
a display; and
wherein the processor is further configured to obtain a list of wireless network APs usable at a current location of the electronic device through the search of the wireless network AP and to check information associated with each of the wireless network APs in the list based on the profile extended information, and wherein the display is configured to display the information associated with each of the wireless network APs in the list.

8. The electronic device of claim 1, wherein the communication interface is configured to search the wireless network AP when a signal of a wireless network which the electronic device currently uses becomes weak, and the processor is further configured to provide a notification that a wireless network of an operator different from an operator of the wireless network AP is usable, based on a result of the search of the wireless network AP and the profile extended information.

9. A method for operating an electronic device, the method comprising:

generating profile extended information for a profile, based on profile information of the profile installed on a secure memory of the electronic device;

checking profile extended information of a target profile if a profile switch event occurs;

performing network registration for the target profile based on a result of the checking;

searching a wireless network access point (AP);

verifying an authentication method of the wireless network AP from the profile extended information associated with the wireless network AP obtained by searching the wireless network AP;

switching from a first profile currently being activated to a second profile associated with an operator of the wireless network AP, when the authentication method of the wireless network AP is subscriber identification module (SIM) authentication; and switching from the second profile to the first profile, when authentication of the wireless network AP is complete.

10. The method of claim 9, further comprising:

performing a network search, when the profile switch event occurs; and updating profile extended information based on network information obtained by the network search, wherein performing the network registration comprises performing the network registration for the target profile using the updated profile extended information, when a profile of the electronic device is switched to the target profile by the profile switch event.

11. The method of claim 10, wherein performing the network registration further comprises:

performing a network re-search when a time interval between a final network search time and a current time is greater than a first threshold value or a distance between a network search location and a current location of the electronic device is greater than a second threshold value; and performing the network registration for the target profile using network information obtained by the network re-search.

12. The method of claim 9, wherein the profile switch event occurs based on at least one of a setting of the electronic device, a user input, a setting of a profile operator, a network state, a profile state, the profile information, or the profile extended information.

13. The method of claim 9, further comprising:

updating the profile extended information with an authentication value generated in authenticating the wireless network AP; and performing wireless network re-authentication based on the authentication value, when the electronic device connects to the wireless network AP again.

14. The method of claim 9, further comprising:

adjusting a priority of each wireless network AP in a list of wireless network APs usable at a current location of the electronic device, obtained by searching the wireless network AP.

15. The method of claim 9, further comprising:

displaying associated information checked from the profile extended information for each wireless network AP, in a list of wireless network APs usable at a current location of the electronic device, obtained by the searching as being.

16. The method of claim 9, further comprising:

performing the network search, when a signal which the electronic device currently uses becomes weak; and notifying that a wireless network of an operator different from an operator of the wireless network is usable, based on a result of searching the wireless network AP and the profile extended information.

* * * * *